US008373577B2

(12) United States Patent
Ieda et al.

(10) Patent No.: US 8,373,577 B2
(45) Date of Patent: Feb. 12, 2013

(54) VEHICLE-MOUNTED COMMUNICATION DEVICE

(75) Inventors: Kiyokazu Ieda, Kariya (JP); Yuichi Murakami, Chiryu (JP); Shingo Fujimoto, Tokai (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 336 days.

(21) Appl. No.: 12/884,583

(22) Filed: Sep. 17, 2010

(65) Prior Publication Data

US 2011/0068949 A1    Mar. 24, 2011

(30) Foreign Application Priority Data

Sep. 24, 2009 (JP) ................................ 2009-219586

(51) Int. Cl.
*G08G 1/00* (2006.01)
*B60Q 1/00* (2006.01)
*H01Q 1/32* (2006.01)

(52) U.S. Cl. ........ 340/902; 340/901; 340/903; 340/905; 340/425.5; 455/129; 455/575.7; 343/711; 343/729; 343/757

(58) Field of Classification Search .................. 340/902; 343/711
See application file for complete search history.

(56) References Cited

U.S. PATENT DOCUMENTS

| | | | | |
|---|---|---|---|---|
| 7,107,085 | B2 * | 9/2006 | Doi | 455/575.7 |
| 7,271,736 | B2 * | 9/2007 | Siegel et al. | 340/902 |
| 7,355,525 | B2 * | 4/2008 | Tengler et al. | 340/905 |
| 8,175,532 | B2 * | 5/2012 | Nanda et al. | 455/63.4 |
| 2003/0234720 | A1 | 12/2003 | MacNeille et al. | |
| 2007/0244643 | A1 | 10/2007 | Tengler et al. | |

FOREIGN PATENT DOCUMENTS

| | | | |
|---|---|---|---|
| JP | 2005-39552 | A | 2/2005 |
| JP | 2005-174237 | A | 6/2005 |
| JP | 2008-153813 | A | 7/2008 |
| WO | 2010/465966 | A1 | 4/2010 |

OTHER PUBLICATIONS

European Search Report issued in European Application No. 10176758.0-2220 dated Mar. 11, 2011 (6 pages).

Roy, S., et al., "Service differentiation in multi-hop intervehicular communication using directional antenna," Vehicular Technology Conference, 2004, VTC2004-Spring., vol. 4, May 17, 2004, pp. 2176-2180.

* cited by examiner

*Primary Examiner* — Donnie Crosland
(74) *Attorney, Agent, or Firm* — Sughrue Mion, PLLC

(57) ABSTRACT

A vehicle-mounted communication device includes a non-directional antenna provided at a vehicle and having a directional characteristic in all directions uniformly in a horizontal plane, at least one of directional antennas provided at the vehicle and having a directional characteristic in a specific direction, an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received.

20 Claims, 12 Drawing Sheets

VEHICLE-MOUNTED COMMUNICATION DEVICE

CROSS REFERENCE TO RELATED APPLICATIONS

This application is based on and claims priority under 35 U.S.C. §119 to Japanese Patent Application 2009-219586, filed on Sep. 24, 2009, the entire content of which is incorporated herein by reference.

TECHNICAL FIELD

This disclosure relates to a communication device mounted to a vehicle.

BACKGROUND DISCUSSION

Technologies related to a road-to-vehicle communication and an inter-vehicle communication have been developed so far. By means of the road-to-vehicle communication, information related to a road is sent from an infrastructure equipment, provided on the road, to a vehicle, and by means of the inter-vehicle communication, information is directly sent from an own vehicle to the other vehicle by use of a communication device provided at the own vehicle. Those technologies are used for improving safe driving.

Specifically, those technologies are used for preventing vehicles from colliding at intersections where low visibility is prevalent and the like. For example, in a case where a vehicle is approaching the intersection with low visibility, information indicating that the own vehicle is approaching the intersection is sent by means of an antenna attached to a front portion of the own vehicle to another vehicle approaching the own vehicle, so that the other vehicle may recognize in advance that the own vehicle is approaching the intersection. This communication may be appropriately executed by use of an antenna having a directional characteristic (hereinafter referred to as a directional antenna). On the other hand, in a case of the road-to-vehicle communication, because the own vehicle basically communicates with a base station provided along a road ahead of the own vehicle, an antenna not having a directional characteristic (hereinafter referred to as a non-directional antenna) may be used for appropriate communication. Disclosed in JP2005-174237A and JP2008-153813A are communication devices being equipped with a directional antenna and a non-directional antenna.

An inter-vehicle communication device of JP2005-174237A mounted to an own vehicle wireless-communicates with a communication device mounted to another vehicle. The inter-vehicle communication device is configured by antennas, a directional characteristic changing means and the like, and on the basis of information related to a road condition, for example information of an existence of an intersection ahead of the own vehicle, the antenna is switched to be used as a transmitter or a receiver, at the same time, a directional characteristic of a radio wave to be sent or to be received is changed by use of the antenna.

A small wireless communication device disclosed in JP2008-153813A is configured by an excitation element of an integrated antenna and passive elements positioned in the vicinity of the excitation element of the integrated antenna. The small wireless communication device changes a directional characteristic of an antenna by turning on/off a connection between the excitation element and the passive element via a semiconductor element.

According to the communication device used for the vehicle-to-vehicle communication disclosed in JP2005-174237A, the antenna itself is physically rotated in order to change a directional characteristic of a radio wave to be sent/received, the device needs to be formed with a actuating portion for actuating the antenna and a controlling portion by which the actuation of the actuating portion is controlled. Accordingly, a circuit structure and a mechanism of the device are more complicated, thereby increasing a cost thereof.

Further, according to the small wireless communication device disclosed in JP2008-153813A, in order to change a directional characteristics of a radio wave to be sent/received, because a directional characteristic of the integrated antenna of the device is directly changed by turning on/off the connection between the excitation element and the passive element via the semiconductor element, the small wireless communication device needs to be formed with a plurality of passive elements and a control circuit by which the connection between the excitation element and the passive elements are electrically turned on/off. Accordingly, a structure of the control circuit is more complicated. Furthermore, because an available antenna does not have the abovementioned configuration, the antenna disclosed in JP2008-153813A needs to be newly developed, thereby increasing a cost thereof.

A need thus exists to provide a vehicle-mounted communication device, which is not susceptible to the drawback mentioned above.

SUMMARY

According to an aspect of this disclosure, a vehicle-mounted communication device includes a non-directional antenna provided at a vehicle and having a directional characteristic in all directions uniformly in a horizontal plane, at least one of directional antennas provided at the vehicle and having a directional characteristic in a specific direction and an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received.

According to another aspect of this disclosure, a vehicle-mounted communication device includes a non-directional antenna provided at a vehicle and having a directional characteristic in all directions uniformly in a horizontal plane, at least one of directional antennas provided at the vehicle and having a directional characteristic in a specific direction, an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received, and the antenna switching portion switching so as to be connected to the directional antenna in a case where the information to be received is received on the basis of a sent radio wave transmitted in a specific direction through the air.

According to further aspect of this disclosure, a vehicle-mounted communication device includes a non-directional antenna provided at a vehicle and having a directional characteristic in all directions uniformly in a horizontal plane, at least one of directional antennas provided at the vehicle and having a directional characteristic in a specific direction, an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received, and the antenna switching portion switching so as to be connected to the non-directional antenna in a case where the information to be sent indicates that there is an obstacle affecting a driving of the vehicle.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
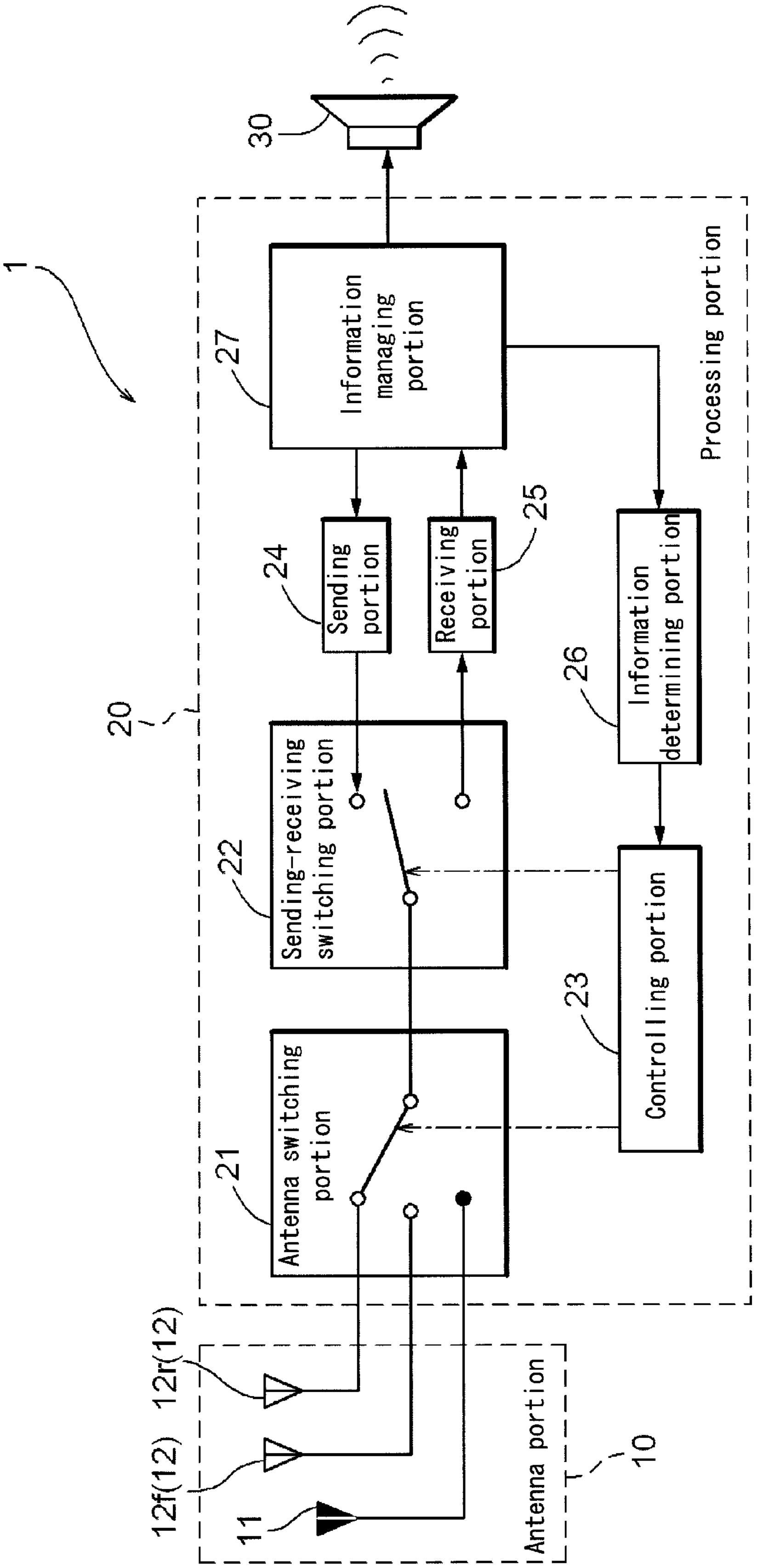
FIG. 1 is a block diagram schematically indicating a simple overview of a configuration of a vehicle-mounted communication device.

The embodiment of this disclosure related to a communication device mounted to a vehicle (hereinafter referred simply to as a communication device 1) will be explained with reference to FIGS. 1 through 8B. The communication device 1 is capable of executing an information to be sent/received related to a traveling manner of the vehicle 100 by means of a wireless communication device, and the communication device 1 includes a function for changing a directional characteristic of an antenna provided at the communication device 1 on the basis of the information to be sent/received. FIG. 1 is a block diagram schematically indicating a simple overview of a configuration of the communication device 1. The communication device 1 includes an antenna portion 10, a processing portion 20 and an alarming portion 30.

The antenna portion 10 includes a non-directional antenna 11 antenna and a directional antenna 12. In FIG. 1, for easier understanding, the non-directional antenna 11 is painted black, and the directional antenna is painted white. In this embodiment, two directional antennas 12 (12*f* and 12*r*) are provided, one of the directional antennas 12 being provided at a front portion of the vehicle 100, and the other of the directional antennas 12 being provided at a rear portion of the vehicle 100. The processing portion 20 includes an antenna switching portion 21, a sending-receiving switching portion 22, a controlling portion 23, a sending portion 24, a receiving portion 25, an information determining portion 26 and an information managing portion 27. The processing portion 20 of the communication device 1 includes a central processing unit (hereinafter referred to as a CPU) as a core member, and the abovementioned functional portions for executing processes for the wireless communication of the vehicle are configured by hardware, software or both of them.

Figure 2A:
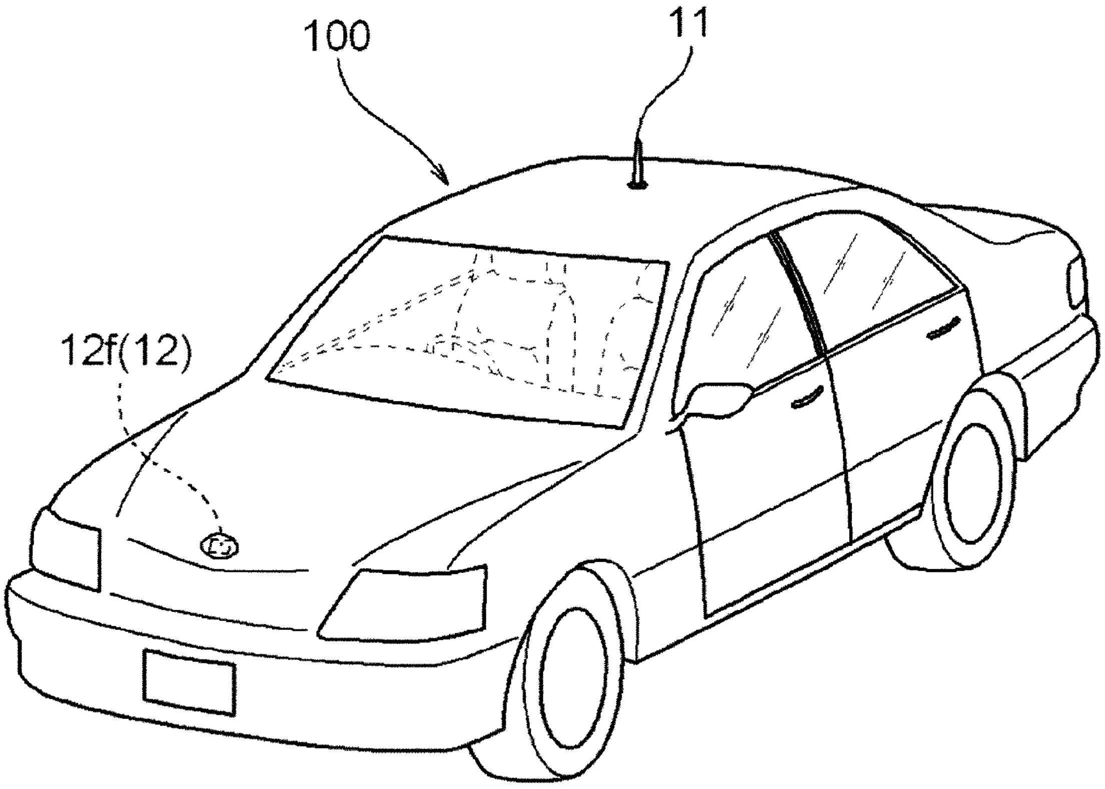
FIG. 2 is a diagram indicating a vehicle to which the vehicle-mounted communication device is provided.
Figure 2B:
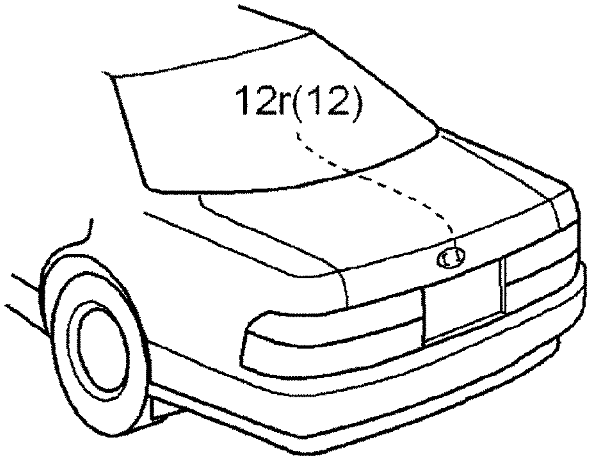

The non-directional antenna 11 provided at the vehicle 100 has a directional characteristic to send or receive a radio wave in all directions uniformly in a horizontal plane. The non-directional antenna 11 may be configured by a known rod antenna as indicated in FIG. 2, therefore the horizontal plane mentioned in the embodiment is orthogonal to an axis of the rod antenna. The above-mentioned directional characteristic, sending or receiving a radio wave in all directions uniformly in the horizontal plane, indicates that an identical antenna gain is obtained at each position on the horizontal plane as long as being located so as to have an identical distance from the rod antenna. The non-directional antenna 11 in this configuration is provided on a top portion (e.g., a roof) of the vehicle 100 in a manner where its axis extends upwardly and perpendicularly relative to the vehicle 100. In this configuration, the non-directional antenna 11 is capable of receiving a radio wave transmitted through the air in a horizontal direction of the vehicle 100, and of sending a radio wave in the horizontal direction of the vehicle 100.

One or more directional antenna 12 is provided at the vehicle 100, and each directional antenna 12 has a directional characteristic to send or receive a radio wave in a specific direction. In the embodiment, the directional antenna 12 is configured by a front directional antenna 12*f* and a rear directional antenna 12*r*. The directional antenna 12 may be configured by a plate shaped antenna illustrated in FIG. 2. "Having a directional characteristic in a specific direction" indicates that the antenna obtains a larger antenna gain in a specific direction. The front directional antenna 12*f* is provided at a front portion of the vehicle, for example in the vicinity of an emblem provided at the front portion of the vehicle, in a manner where a peak of the directional characteristic of the front directional antenna 12*f* faces a front direction of the vehicle 100 (see FIG. 2). In this configuration, the front directional antenna 12*f* is capable of receiving a radio wave transmitted from the front of the vehicle 100 and capable of sending a radio wave toward the front of the vehicle 100. The rear directional antenna 12*r* is provided at a rear portion of the vehicle, for example in the vicinity of an emblem located at the rear portion of the vehicle 100, in a manner where a peak of the directional characteristic of the rear directional antenna 12*r* faces a rear direction of the vehicle (see FIG. 2). In this configuration, the rear directional antenna 12*r* is capable of receiving a radio wave transmitted from the rear of the vehicle 100 and capable of sending a radio wave toward the rear of the vehicle 100.

Figure 3:
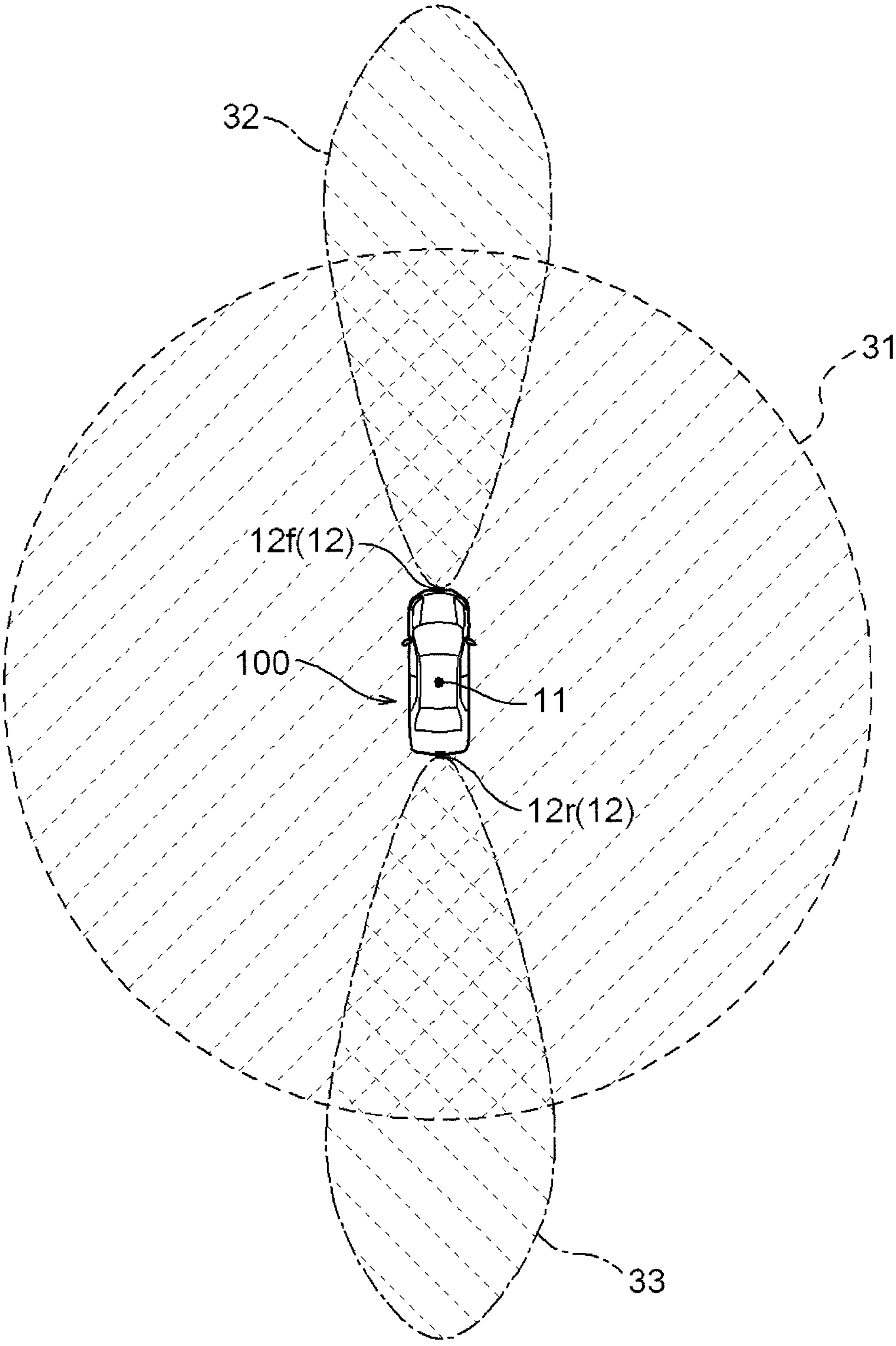
FIG. 3 is a diagram indicating a directional characteristic of each antenna on a horizontal plane.

Directional characteristics (communication areas) of the non-directional antenna 11, the front directional antenna 12*f* and the rear directional antenna 12*r* provided at the vehicle 100 are indicated in FIG. 3. Each of the directional characteristics indicates an area in which each antenna obtains a gain that is a predetermined value or more. Each antenna obtains the gain being less than the predetermined value out of the above-mentioned area, where the communications is not completely disabled. The directional characteristic of the non-directional antenna 11 is indicated in FIG. 3 with hatchings that extend downwardly from the right to the left. The area visually-enhanced by the hatchings that extend downwardly from the right to the left is a communicatable area 31 of the non-directional antenna 11. The directional characteristics of the front directional antenna 12*f* and the rear directional antenna 12*r* are indicated in FIG. 3 with hatchings that extend downwardly from the left to the right. The communicatable area of the front directional antenna 12*f* is indicated by a numeral 32, and a communicatable area of the rear directional antenna 12*r* is indicated by a numeral 33.

A distance within which a radio wave is transmittable by means of the antenna is generally determined on the basis of the antenna gain of each antenna. The antenna gain of the antenna is inversely proportional to an angle (half-value angle) of the directional characteristic of the antenna. In other words, the antenna whose antenna gain is relatively larger obtains a narrower angle in which the radio wave is transmittable. Accordingly, in a case where a level of electric power supplied to the non-directional antenna 11 is identical to a level of electric power supplied to the directional antenna 12, a distance in which a radio wave is transmittable by means of the directional antenna 12 is longer compared to that of the non-directional antenna 11. The difference between the transmittable distance of the non-directional antenna 11 and the transmittable distance of the directional antenna 12 is clearly shown in FIG. 3. As indicated in FIG. 3, the directional antenna 12 has a longer transmittable distance than that of the non-direction antenna 11 when electric power at the same level is supplied, respectively. The vehicle-mounted communication device 1 has a function to communicate by switching an antenna to be used between the non-directional antenna 11 and the directional antenna 12 (e.g., selectively use the non-directional antenna 11 or the directional antenna 12), each of which has a different transmittable distance, with reference to information to be sent or to be received.

In a case where information is sent from the vehicle 100, the antenna switching portion 21 switches an antenna to be used for sending the information between the non-directional antenna 11 and the directional antenna 12 with reference to the information to be sent from the vehicle 100, and in a case where a sent radio wave of information transmitted through the air is received, the antenna switching portion 21 switches an antenna to be used for receiving the information between the non-directional antenna 11 and the direction antenna 12 with reference to the information to be received. In the embodiment, because the directional antenna 12 is configured by the front directional antenna 12*f* and the rear directional antenna 12*r*, the antenna switching portion 21 switches an antenna to be used among the non-directional antenna 11, the front directional antenna 12*f* and the rear directional antenna 12*r* (e.g., selectively uses one of the non-directional antenna 11, the front directional antenna 12*f* and the rear directional antenna 12*r*).

The communication device 1 in the embodiment includes plural antennas (the non-directional antenna 11 and the directional antenna 12) in order to establish a wireless communication with other communication device (e.g., a base station or other vehicle). The wireless communication described in this disclosure includes a road-to-vehicle communication, and inter-vehicle communication and the like. In the road-to-vehicle communication, the own vehicle exchanges information with, for example a communication device provided at the side of a road. In the inter-vehicle communication, information is directly exchanged between the vehicles. Further, the road-to-vehicle communication described in this disclosure includes a simultaneous communication and an individual communication. By means of the simultaneous communication, identical information is transmittable within the communicatable range. Specifically, information such as an obstacle, a road condition, a pedestrian, a vehicle located around the own vehicle and the like are simultaneously transmitted to vehicles located within the communicatable range. By means of the individual communication, information individually different from each other is transmitted to vehicles, respectively. Specifically, by means of the individual communication, a positional information such as a relative position between the own vehicle and an obstacle is transmitted.

The inter-vehicle communication is available to provide traffic congestion information or accident information from a front-driving vehicle to a vehicle traveling so as to follow the front-driving vehicle (hereinafter referred to as a following vehicle). The inter-vehicle communication may be executed between the front-driving vehicle and a specific following vehicle or may be executed between the front-driving vehicle and a large unspecific number of following vehicles. For example, in a case where the information is provided to the specific following vehicle from the front-driving vehicle, route guiding information outputted by a car navigation system of the front-driving vehicle may be provided to the specific following vehicle. In a case where the information is provided to the large unspecific number of following vehicles from the front-driving vehicle, the front vehicle, such as the vehicle 100 in this disclosure, may provide the traffic congestion information occurring ahead of the vehicle 100 to the following vehicles.

Accordingly, the antenna switching portion 21 selects the non-directional antenna 11 in a case where a direction in which the information is sent from the vehicle 100 does not need to be specified, or in a case where a direction in which the information is sent from the vehicle is not able to be specified, and the antenna switching portion 21 selects the non-directional antenna 11 in a case where the information needs to be sent in a specific direction, or in a case where a direction in which the information is sent from the vehicle 100 is able to be specified.

The non-directional antenna 11 and the directional antenna 12 are capable of receiving the radio wave transmitted through the air. The antenna switching portion 21 selects the non-directional antenna 11 in a case where the vehicle 100 is in a stand-by state for receiving information that is possible to be transmitted in all directions relative to the vehicle 100. The antenna switching portion 21 selects the front directional antenna 12*f* in a case where the vehicle 100 is in the stand-by state for receiving information sent from the front of the vehicle 100. The antenna switching portion 21 selects the rear directional antenna 12*r* in a case where the vehicle 100 is in the stand-by state for receiving information sent from the rear of the vehicle 100.

The sending-receiving switching portion 22 switches a portion to be used between the sending portion 24 and the receiving portion 25. In a case where information is sent from the vehicle 100, the sending-receiving switching portion 22 selects the sending portion 24, and in a case where the vehicle 100 receives information, the sending-receiving switching portion 22 selects the receiving portion 25.

In this configuration, one of the non-directional antenna 11, the front directional antenna 12*f* and the rear directional antenna 12*r* is electrically connected to one of the sending portion 24 and the receiving portion 25 by means of the antenna switching portion 21 and the sending-receiving switching portion 22, respectively. In this configuration, by means of the vehicle-mounted communication device 1 of the embodiment, information may be sent from the vehicle 100 by use of the front directional antenna 12*f* or the rear directional antenna 12*r*, information sent from another vehicle may be received by the non-directional antenna 11 of the vehicle 100, or information sent from another vehicle may be received by front directional antenna 12*f* or the rear directional antenna 12*r*. The switching operations of the antenna switching portion 21 and the sending-receiving switching portion 22 are executed by the controlling portion as will be explained later.

The sending portion 24 generates information to be sent by means of the antenna portion 10. Specifically, the sending portion 24 superimposes the information on a radio wave having a predetermined frequency and being sent by the antenna portion 10. The information to be sent is provided by the information managing portion 27. Because this information generating process is executed by use of a known technology, detailed explanations will be omitted. The information generated by the sending portion 24 is transmitted through the air from the antenna portion 10 via the sending-receiving switching portion 22 and the antenna switching portion 21.

The receiving portion 25 receives information transmitted through the air by means of the antenna portion 10. Specifically, the receiving portion 25 obtains the information that is superimposed on the radio wave received via the antenna portion 10, the radio wave having a predetermined frequency. Because this information obtaining process is executed by use of a known technology, detailed explanations will be omitted. The information obtained by the receiving portion 25 is transmitted to the information managing portion 27.

The information managing portion 27 organizes and manages the information to be sent and the received information by the vehicle-mounted communication device 1. The information to be sent is information obtained from another communication device that is not provided at the vehicle 100 or is information that is generated by means of the car navigation system or the like of the vehicle 100. The information obtained from another communication device that is not provided at the vehicle 100 is information that is received by the receiving portion 25 of the vehicle 100. The information generated by the car navigation system or the like is information such as route guide information. The received information indicates information obtained from a communication device that is not provided at the vehicle 100. The information managing portion 27 organizes and manages such various pieces of information.

The information determining portion 26 determines a property of the information to be sent by means of the sending portion 24. The information to be sent by means of the sending portion 24 indicates information to be provided by the information managing portion 27 to the sending portion 24. Accordingly, the information determining portion 26 receives the information that is identical to the information provided from the information managing portion 27 to the sending portion 24. The information determining portion 26 further determines whether the information provided from the information managing portion 27 to the sending portion 24 is information to be sent to a specific vehicle or to be sent to an unspecific number of vehicles. The determination result is then transmitted to the controlling portion 23 as will be explained later. This determination may be executed in a case where the information to be sent includes a property information thereof.

The information determining portion 26 determines a property of the information received by means of the receiving portion 25. The information received by means of the receiving portion 25 indicates information that is transmitted by the receiving portion 25 to the information managing portion 27. Accordingly, the information determining portion 26 receives the information that is identical to the information transmitted from the receiving portion 25 to the information managing portion 27. The information determining portion 26 further determines whether the information transmitted from the receiving portion 25 to the information managing portion 27 is information that had been sent to a specific vehicle or information that needs to be sent from the vehicle 100 to another vehicle. The determination result is then transmitted to the controlling portion 23 as will be explained later.

The controlling portion 23 controls the antenna switching portion 21 and the sending-receiving switching portion 22 on the basis of the determination result of the information determining portion 26. Specifically, the controlling portion 23 controls the antenna switching portion 21 so as to be connected to one of the non-directional antenna 11, the front directional antenna 12*f* and the rear directional antenna 12*r* (e.g., selects one of the non-directional antenna 11, the front directional antenna 12*f* and the rear directional antenna 12*r*). The controlling portion 23 controls the sending-receiving switching portion 22 so as to be connected to the sending portion 24 or the receiving portion 25 (e.g., selects the sending portion 24 or the receiving portion 25).

The alarming portion 30 notifies a passenger of the vehicle 100 of information received by the receiving portion 25. The information received by the receiving portion 25 is transmitted to the alarming portion 30 via the information managing portion 27. Specifically, the alarming portion 30 may be a display (e.g., a monitor) provided within the vehicle or a speaker. Those are functional portions of the vehicle-mounted communication device 1.

Figure 4A:
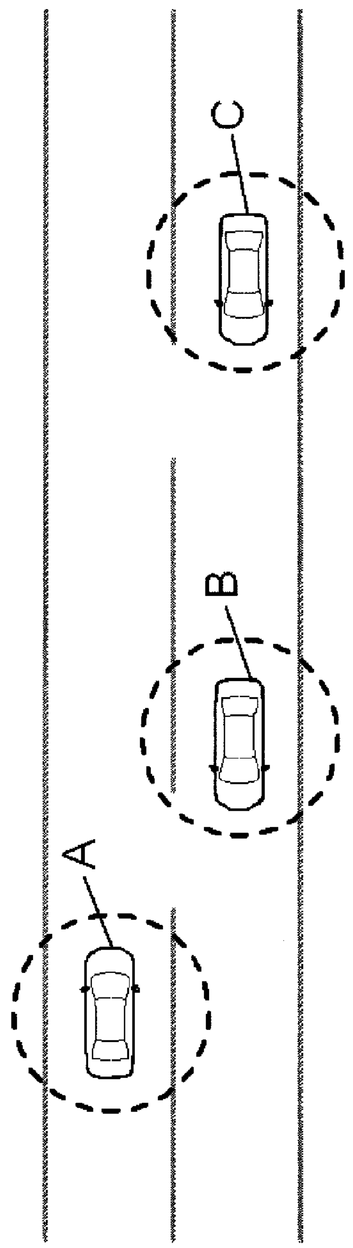
FIGS. 4A through 4D are diagrams for explaining operations of the vehicle-mounted communication device when an emergency vehicle is approaching.

Next, the inter-vehicle communication and the road-to-vehicle communication executed by the vehicle-mounted communication device 1 will be explained. The following explanation is an example of an application of the vehicle-mounted communication device 1, and a configuration and an adaptation of the vehicle-mounted communication device 1 will not be limited to the example. The antenna switching portion 21 may appropriately be switched so as to connect to the directional antenna 12 in a case where the information to be sent to the front of the vehicle 100 is an emergency information indicating that an emergency vehicle D is approaching from the rear of the vehicle 100. The switching manner to the directional antenna 12 will be explained with reference to the drawings. FIGS. 4A through 4D is a diagram indicating an actuation of the vehicle-mounted communication device 1 in a case where the emergency vehicle D is approaching. FIG. 4A is a diagram in which a vehicle A drives on one side of a road, the road having one lane on one side, from the left to the right in FIG. 4A, and vehicles B and C drive on the other side of the road from the right to the left in FIG. 4A. A dashed-line circle enclosing each vehicle indicates that the vehicle is in a receive stand-by state by using the non-directional antenna 11.

Figure 4B:
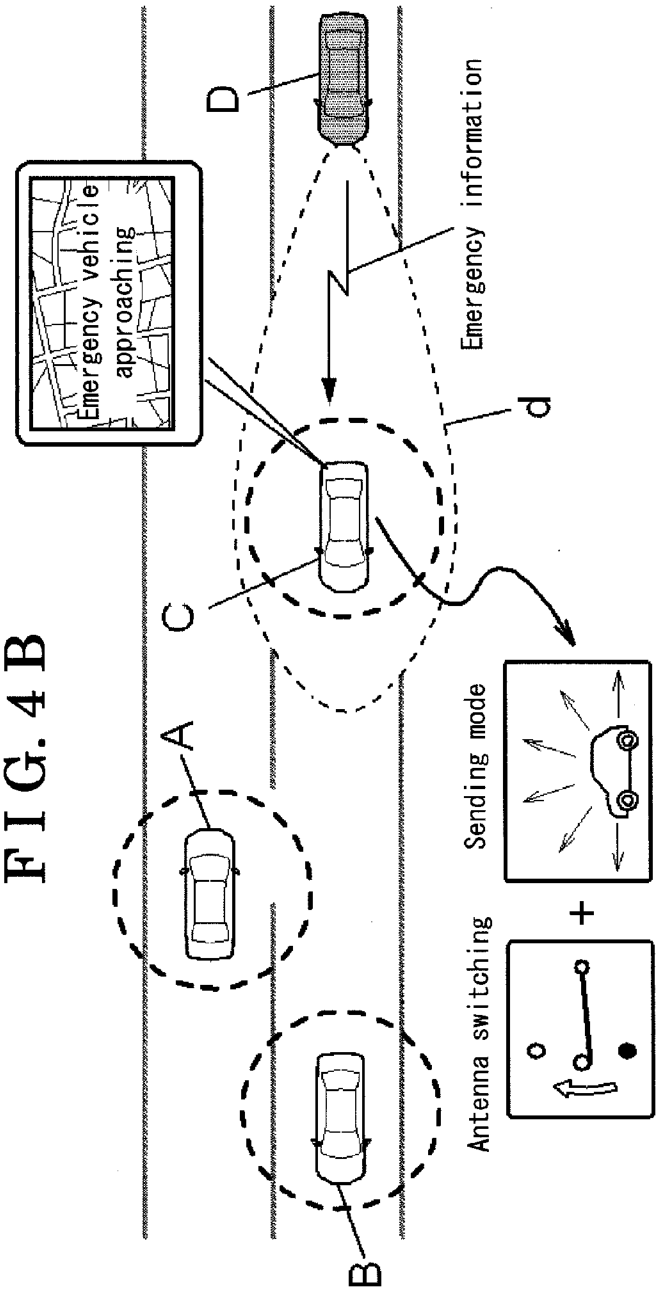
Figure 4C:
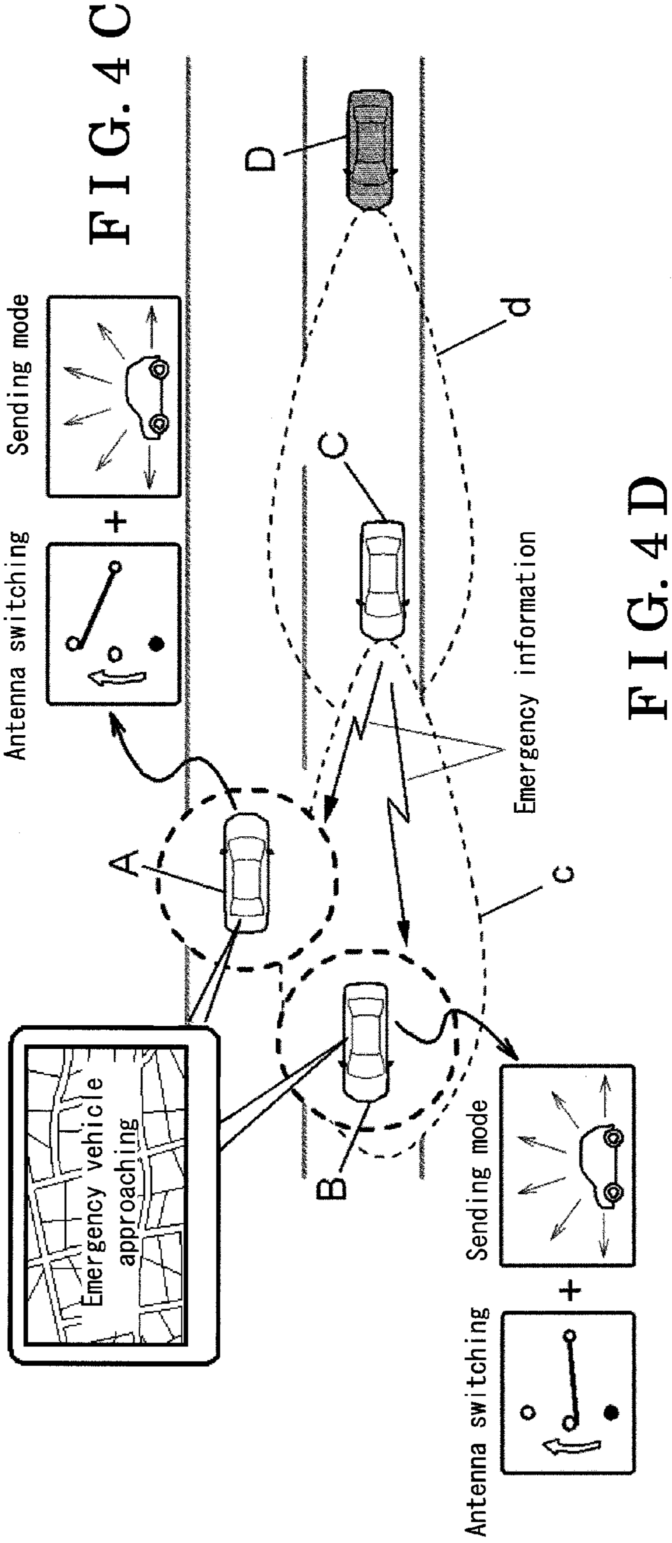

In this situation, supposing that the emergency vehicle D is approaching from the rear of the vehicle C as indicated in FIG. 4B, the emergency vehicle D is sending emergency information indicating that its own vehicle (emergency vehicle D) is approaching by use of the directional antenna toward the front of the emergency vehicle D. A range within which the radio wave sent by the directional antenna of the emergency vehicle D is reachable is indicated by a letter "d".

Once the vehicle-mounted communication device 1 of the vehicle C, that is driving in the receive stand-by state by use of the non-directional antenna 1, receives the emergency information from the rear thereof, the antenna switching portion 21 of the vehicle C turns its state from being connected to the non-directional antenna 11 to being connected to the front directional antenna 12*f*. Specifically, the antenna switching portion 21 selects the front directional antenna 12*f* to be used. Further, the sending-receiving switching portion 22 turns its state from being connected to the receiving portion 25 to being connected to the sending portion 24. Specifically, the sending-receiving switching portion 22 selects the sending portion 24 to be used. Accordingly, the vehicle-mounted communication device 1 of the vehicle C is switched from a receiving mode by use of the non-directional antenna 11 to a sending mode by use of the front directional antenna 12*f*.

For an easier understanding, "antenna switching" and "sending mode" are indicated in FIG. 4B. The schematic view of the antenna switching in FIG. 4B corresponds to the antenna switching portion 21 in FIG. 1. Specifically, in the schematic view of the antenna switching in FIG. 4B, a lower black dot indicates a state where the antenna switching portion 21 is connected to the non-directional antenna 11, a middle white dot indicates a state where the antenna switching portion 21 is connected to the front directional antenna 12*f* and an upper white dot indicates a state where the antenna switching portion 21 is connected to the rear directional antenna 12*r*. Those diagrams will also be applied to the following explanations.

A schematic view of the "sending mode" in FIG. 4B indicates that the sending-receiving switching portion 22 is switched so as to be connected to the sending portion 24. Arrows in six directions in the schematic view of the sending mode in FIG. 4B simply indicate that the vehicle 100 sends the radio wave and does not indicate that the vehicle-mounted communication device 1 can output the radio wave in every direction. The direction of the radio wave sent from the vehicle 100 corresponds to the schematic diagram indicating the switching of the "antenna switching". Those diagrams will also be applied in following explanations. Once the vehicle C receives the emergency information indicting that the emergency vehicle D is approaching from the rear of the vehicle C, the alarming portion 30 (a display monitor in FIG. 4) of the vehicle C displays "emergency vehicle approaching".

A range in which the radio wave sent by the front directional antenna 12*f* of the vehicle C, after the antenna to be used is switched to the front directional antenna 12*f*, is indicated by a letter "c". Once the emergency information, indicating that the emergency vehicle D is approaching from the rear of the vehicle C and being sent from the vehicle C by means of the front directional antenna 12*f* thereof, is received by the vehicles A and B, the alarming portions 30 (the display monitor in FIG. 4) of the vehicles A and B respectively displays "emergency vehicle approaching". Further, the antenna switching portion 21 of the vehicle A switches from being connected to the non-directional antenna 11 to being connected to the rear directional antenna 12*r* (see "antenna switching"), and the sending-receiving switching portion 22 of the vehicle A switches from being connected to the receiving portion 25 from being connected to the sending portion 24 (see "sending mode"). On the other hand, the antenna switching portion 21 of the vehicle B switches from being connected to the non-directional antenna 11 to being connected to the front directional antenna 12*f* (see "antenna switching"), and the sending-receiving switching portion 22 of the vehicle B switches from being connected to the receiving portion 25 to being connected to the sending portion 24 (see "sending mode").

Figure 4D:
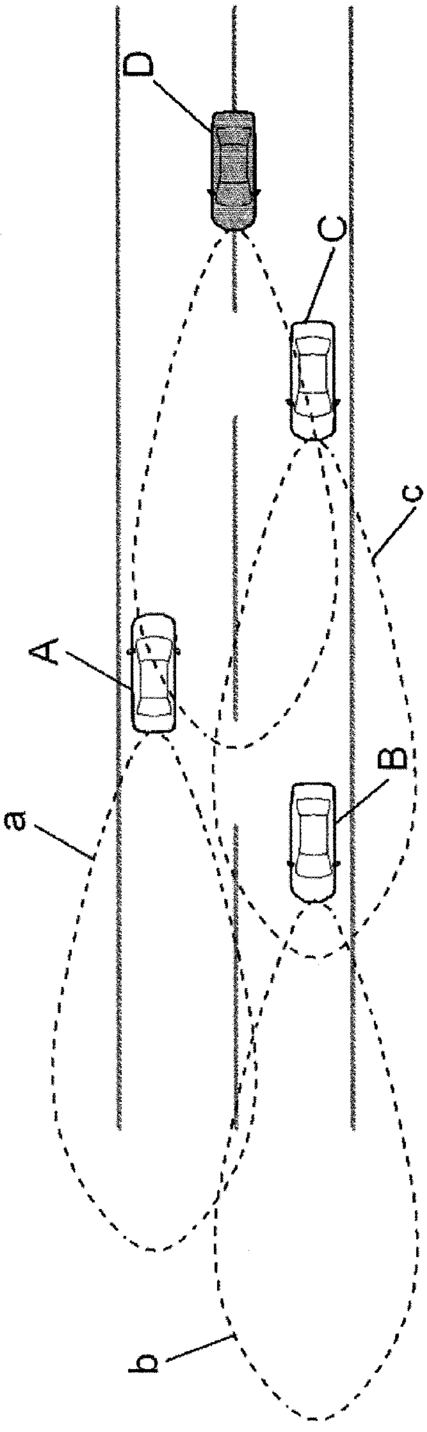

As indicated in FIG. 4D, the vehicle A transmits the emergency information, indicating that the emergency vehicle D is approaching from the front of the vehicle A, to the rear of the vehicle A. Further, the vehicle B transmits the emergency information, indicating that the emergency vehicle D is approaching from the rear of the vehicle B, to the front of the vehicle B. Accordingly, because the emergency information indicating the emergency vehicle D is approaching is send to the vehicle located in the front of the emergency vehicle D, the vehicles A, B and C may be driven onto a shoulder of the road in order to allow the emergency vehicle D to pass unhinderingly. In this configuration, the antenna switching portion 21 switches so as to be connected to the directional antenna 12 in a case where information to be received is obtained on the basis of the radio wave being transmitted through the air in a specific direction relative to the vehicle 100.

Figure 5A:
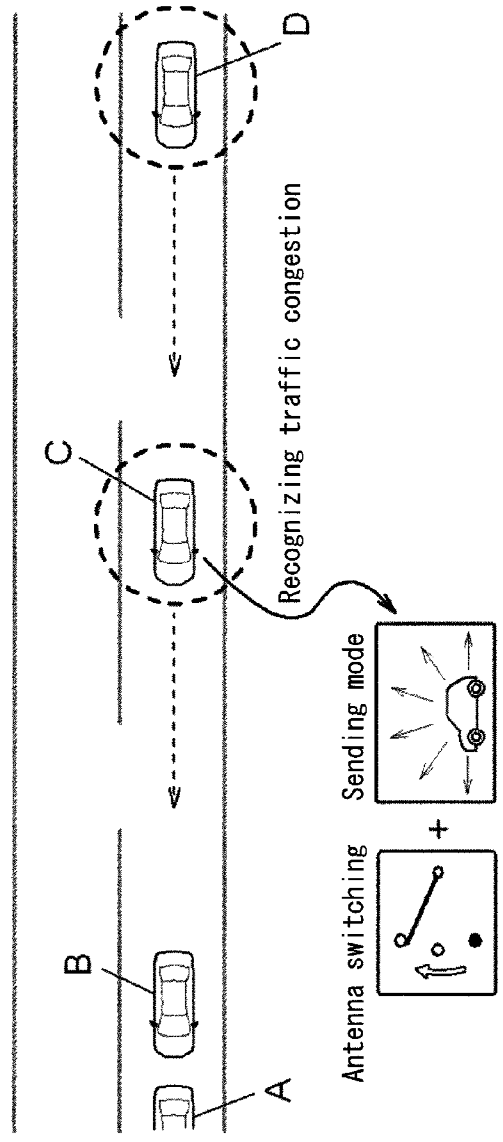
FIGS. 5A and 5B are diagrams for explaining operations of the vehicle-mounted communication device in a case where traffic congestion occurs.

Next, an actuation of the vehicle-mounted communication device 1 when traffic congestion occurs will be explained with reference to FIGS. 5A and 5B. The antenna switching portion 21 in the embodiment switches so as to be connected to the directional antenna 12, in a case where the information to be sent is a traffic congestion information sent toward the rear of the vehicle 100. FIG. 5A is a diagram indicating a situation where the vehicles A and B are stopping and the vehicle C is approaching to the vehicles A and B from the rear thereof. When the driver of the vehicle C finds that the vehicles A and B are stopping in front of the vehicle C, the driver of the vehicle C decreases the speed by a braking operation. Once the speed of the vehicle C becomes equal to or less than a predetermined speed (e.g., 20 km/h) and this speed continues for more than a predetermined time period (e.g., ten seconds), the antenna switching portion 21 of the vehicle-mounted communication device 1 of the vehicle C switches from being connected to the non-directional antenna 11 to being connected to the rear directional antenna 12*r* (see "antenna switching"), and the sending-receiving switching portion 22 of the vehicle-mounted communication device 1 of the vehicle C switches from being connected to the receiving portion 25 to being connected to the sending portion 24. The speed, the time period and the like described above are examples and those may be modified.

Figure 5B:
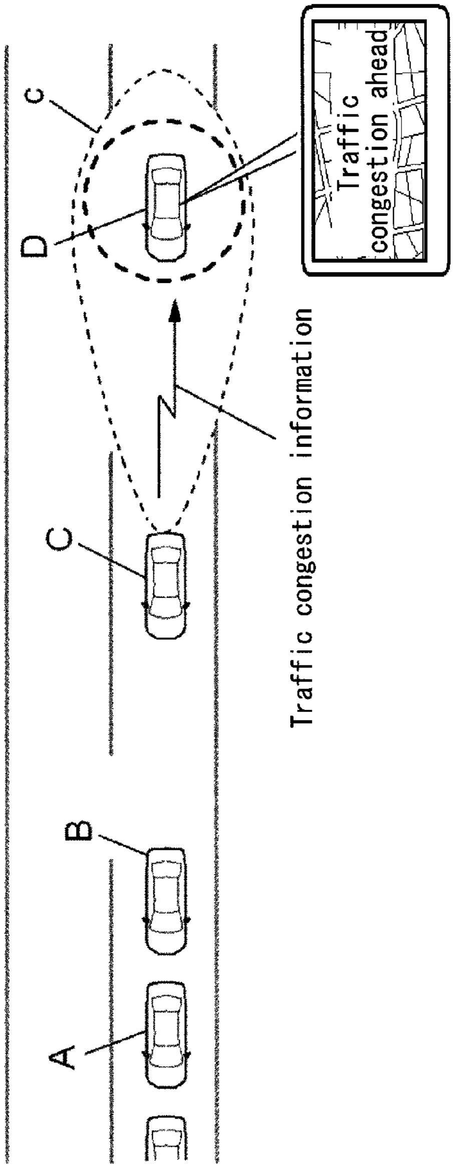

The vehicle-mounted communication device 1 of the vehicle C sends the traffic congestion information indicating that the vehicle C decreases its speed and that traffic congestion occurs ahead to the rear of the vehicle C by means of the rear directional antenna 12*r* (see FIG. 5B). A range within which the traffic congestion information from the vehicle C is reachable is indicated by the letter "c" in FIG. 5B. Once the vehicle-mounted communication device 1 of the vehicle D receives the traffic congestion information sent from the vehicle C located in front of the vehicle D, the vehicle-mounted communication device 1 of the vehicle D displays "Traffic congestion ahead" on a display monitor of the vehicle D. Accordingly, because the driver of the vehicle D has prior knowledge that the traffic congestion occurs ahead of the vehicle D, a possibility that the vehicle D hits the rear portion of the vehicle C may be prevented.

Figure 6A:
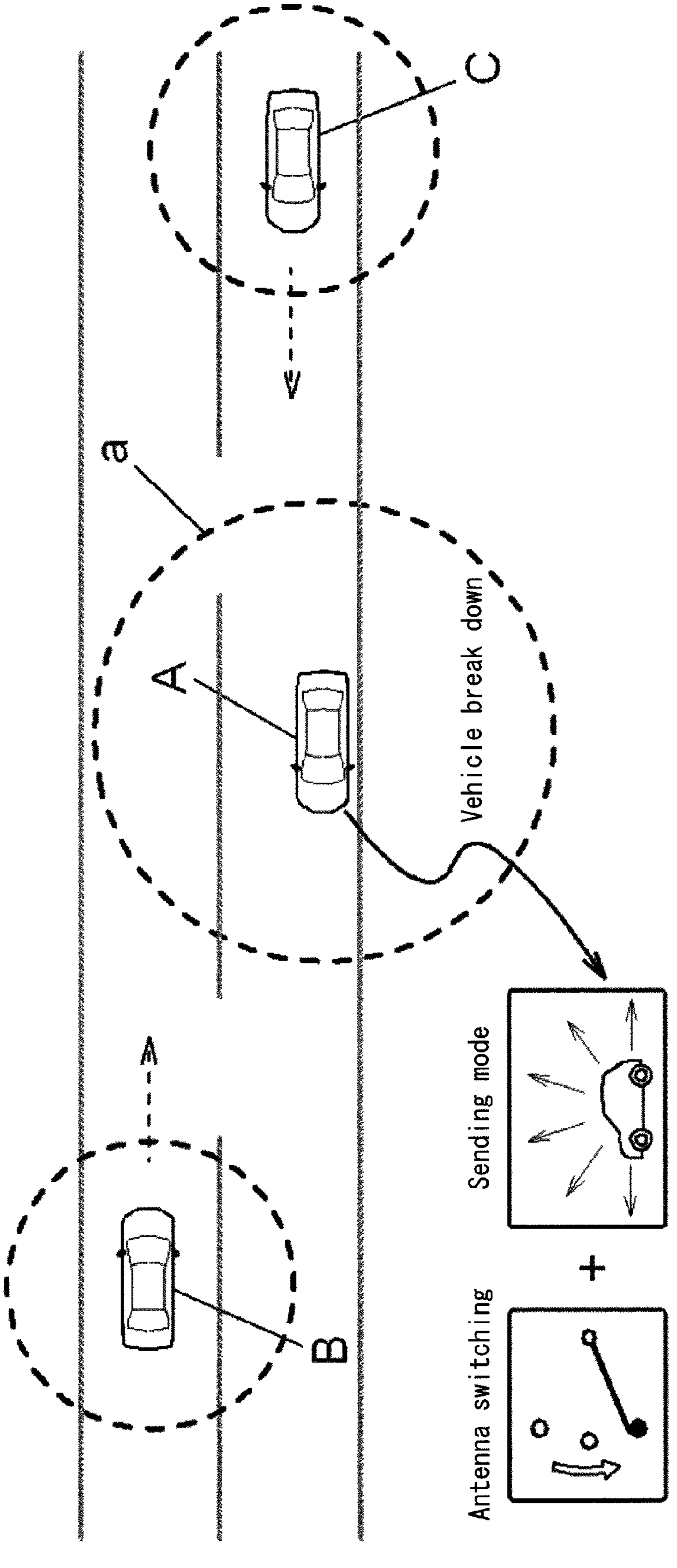
FIGS. 6A through 6C are diagrams for explaining an operation of the vehicle-mounted communication device in a case where there is a parked vehicle ahead.
Figure 6B:
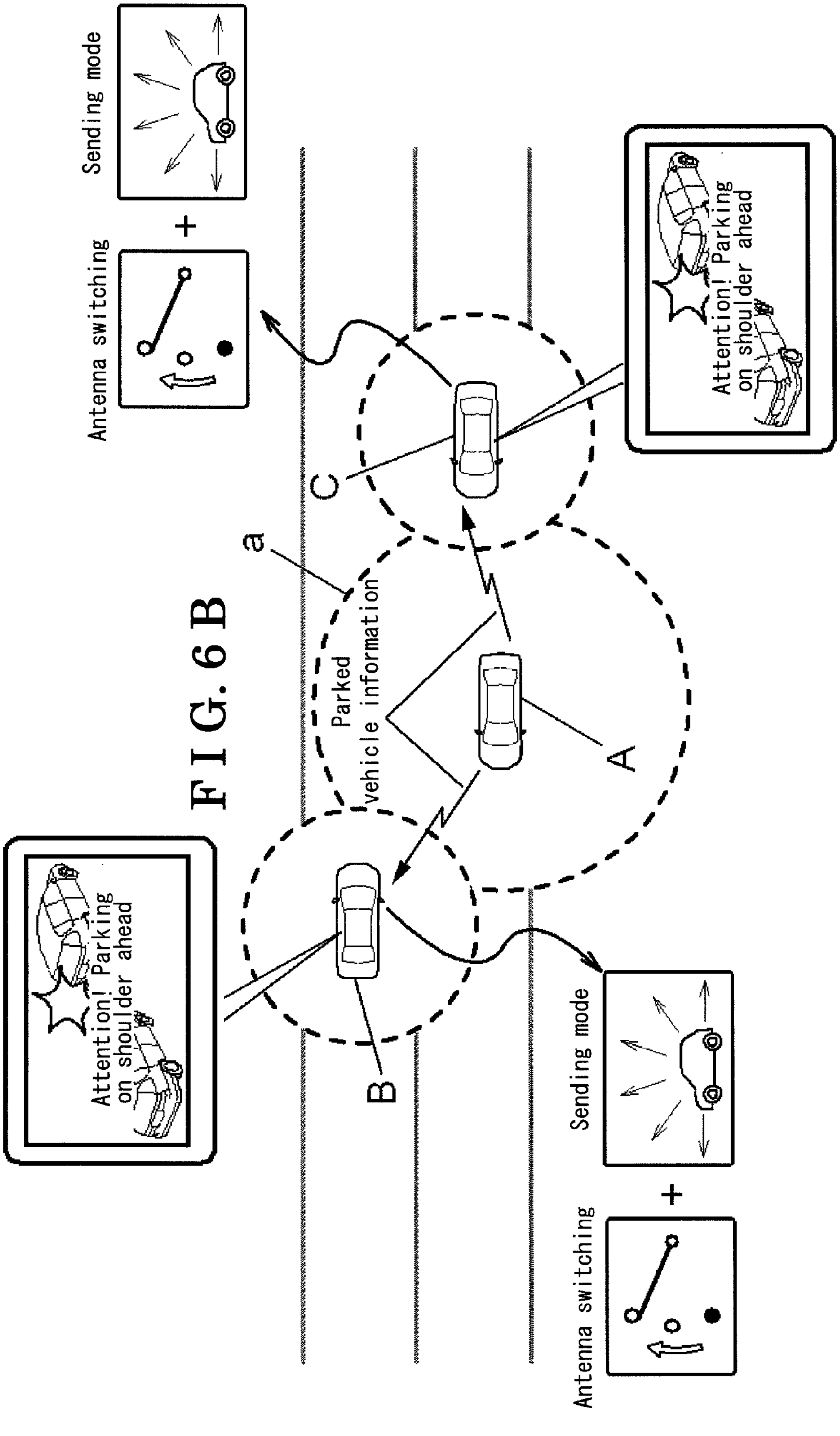
Figure 6C:
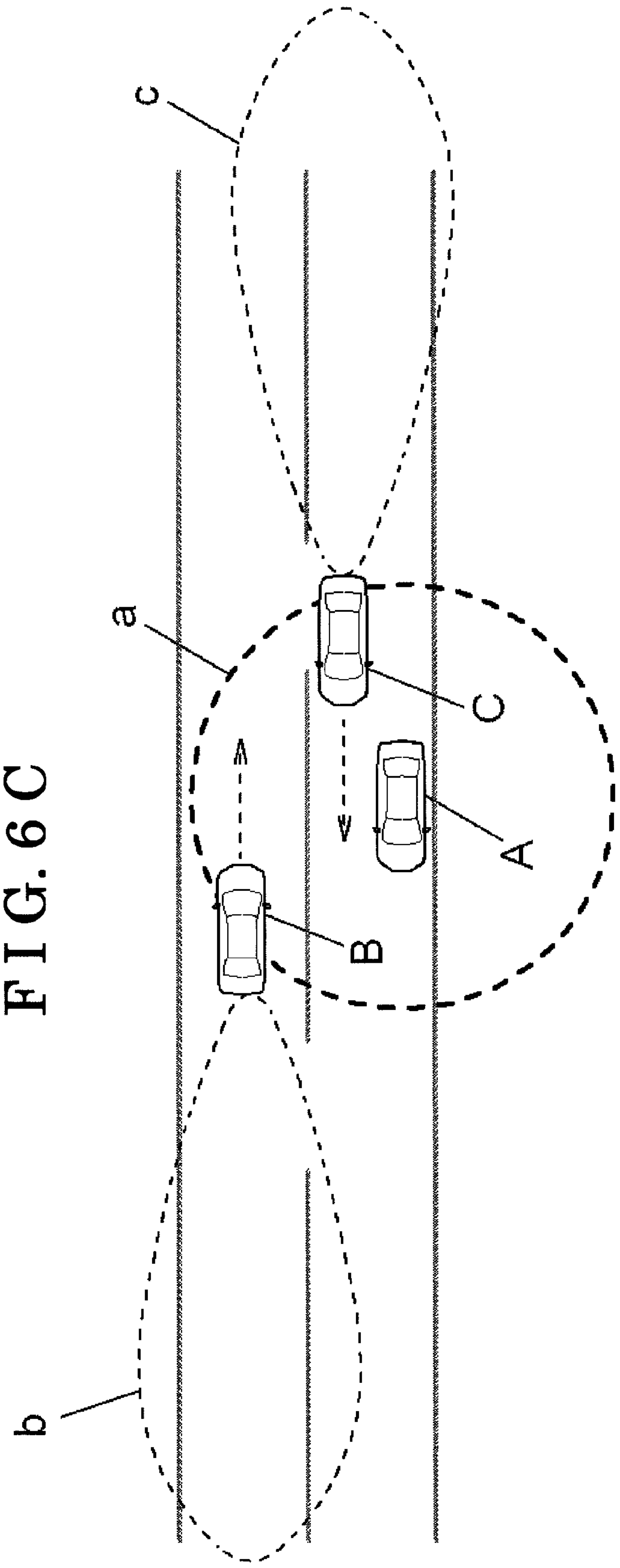

FIG. 6A is a diagram indicating a situation where the vehicle A has a breakdown and is located at a shoulder of the road (e.g., an obstacle). In the embodiment, the antenna switching portion 21 of the vehicle-mounted communication device 1 switches so as to be connected to the non-directional antenna 11 in a case where information indicating that the vehicle 100 is disabled to move, and the sending-receiving switching portion 22 of the vehicle-mounted communication device 1 switches so as to be connected to the sending portion 24. Accordingly, the vehicle-mounted communication device 1 turns in a "sending state by use of the non-directional antenna 11". In FIGS. 6A and 6B, this is indicated by diagrams of "antenna switching" and "sending mode". In this situation, the vehicle-mounted communication device 1 of the vehicle A sends parked vehicle information indicating that a vehicle (the vehicle A) is parked onto a shoulder of the road by use of the non-directional antenna 11.

On the other hand, FIG. 6A also indicates a situation where the vehicle B driving on the opposite lane is approaching from the front of the vehicle A, and the vehicle C is approaching from the rear of the vehicle A. Once the vehicle B enters a range a within which the parked vehicle information sent from the vehicle A is receivable as indicated in FIG. 6B, the vehicle-mounted communication device 1 of the vehicle B displays "Attention! Parking on shoulder ahead" on a display of the vehicle B. At the same time, the vehicle-mounted communication device 1 of the vehicle B sends the parked vehicle information indicating that the vehicle A is stopping ahead on the opposite lane to the rear of the own vehicle (the vehicle B) by means of the rear directional antenna 12*r*. A range within which the parked vehicle information sent from the vehicle B is receivable is indicated by a letter "b" in FIG. 6C.

On the other hand, once the vehicle C enters a range a within which the parked vehicle information sent from the vehicle A is receivable as indicated in FIG. 6B, the vehicle-mounted communication device 1 of the vehicle C displays "Attention! Parking on shoulder ahead" on a display of the vehicle C. At the same time, the vehicle-mounted communication device 1 of the vehicle C sends the parked vehicle information indicating that the vehicle A is stopping ahead on the same lane to the rear of the own vehicle (the vehicle C) by means of the rear directional antenna 12*r*. A range within which the parked vehicle information sent from the vehicle C is receivable is indicated by the letter "c" in FIG. 6C. Accordingly, because the driver has prior knowledge that the vehicle A stops upon the side of the load, a possibility that the vehicles B and C hit the vehicle A may be prevented.

Figure 7A:
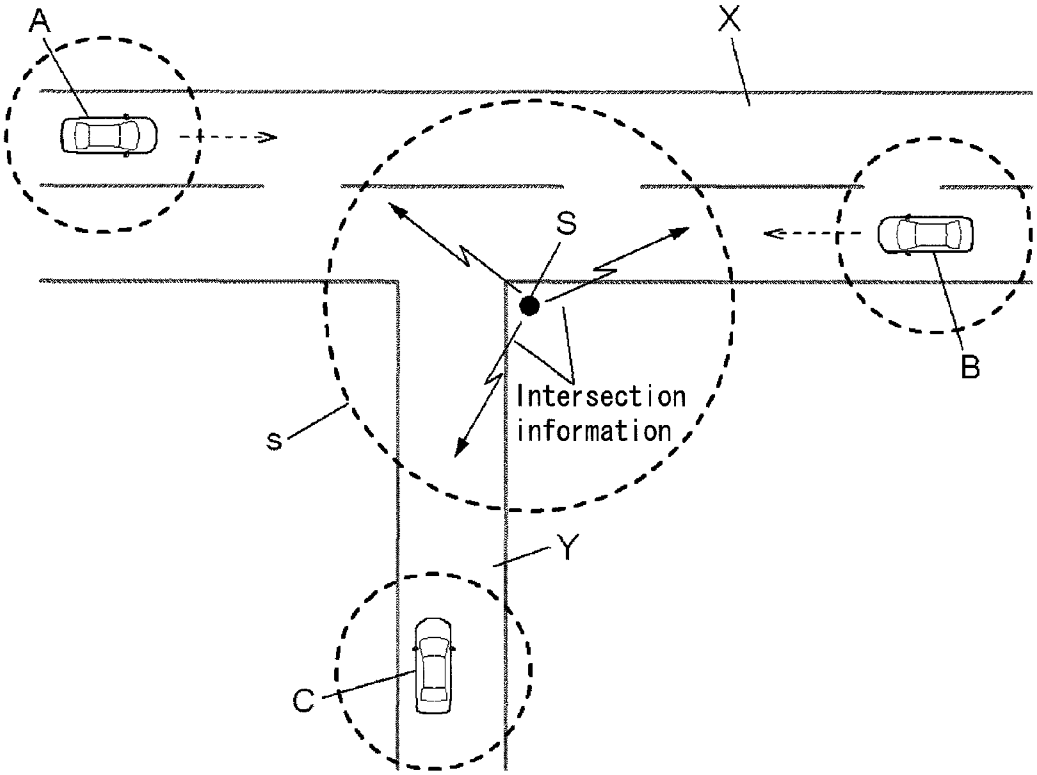
FIGS. 7A and 7B are diagrams for explaining operations of the vehicle-mounted communication device in a case where an own vehicle is approaching an intersection.
Figure 7B:
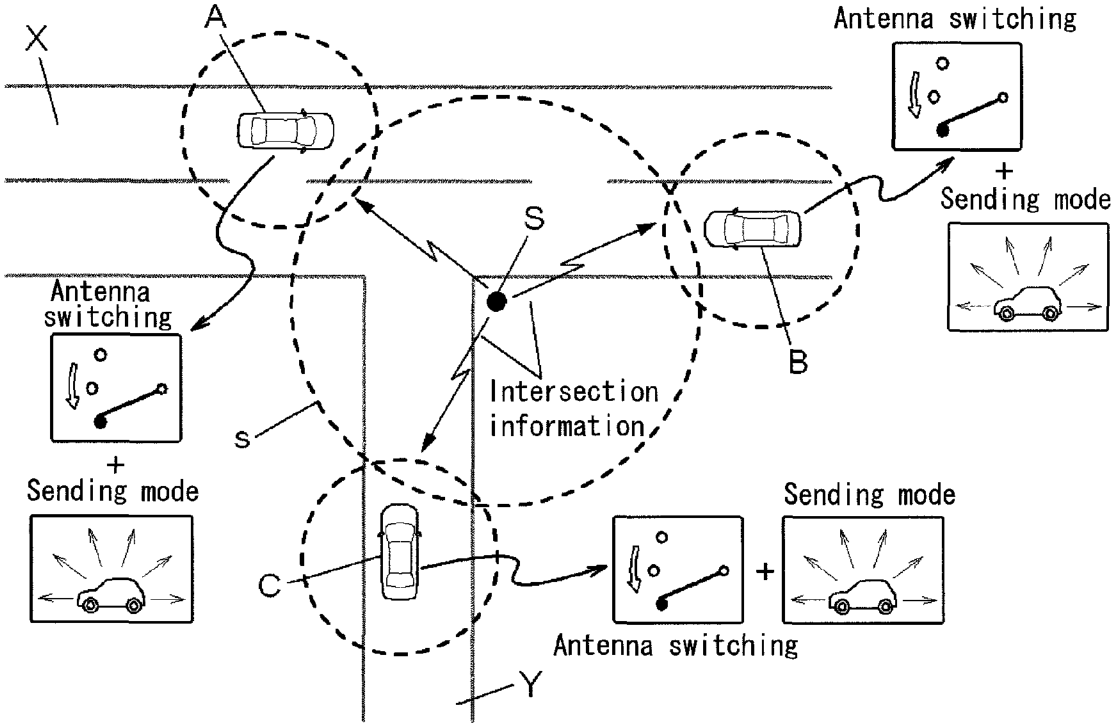
Figure 8A:
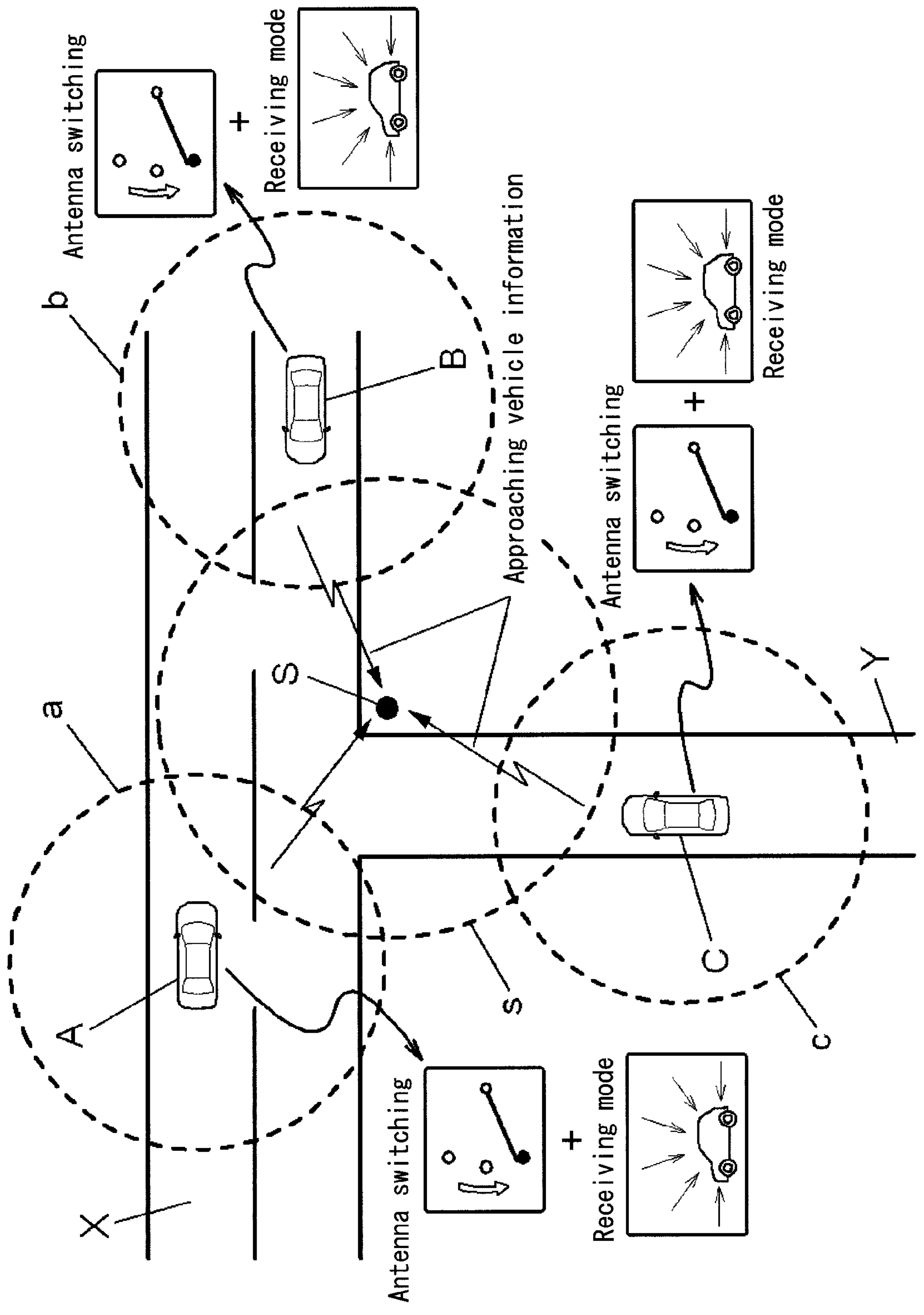
FIGS. 8A and 8B are diagrams for explaining operations of the vehicle-mounted communication device in the case where the own vehicle is approaching the intersection.
Figure 8B:
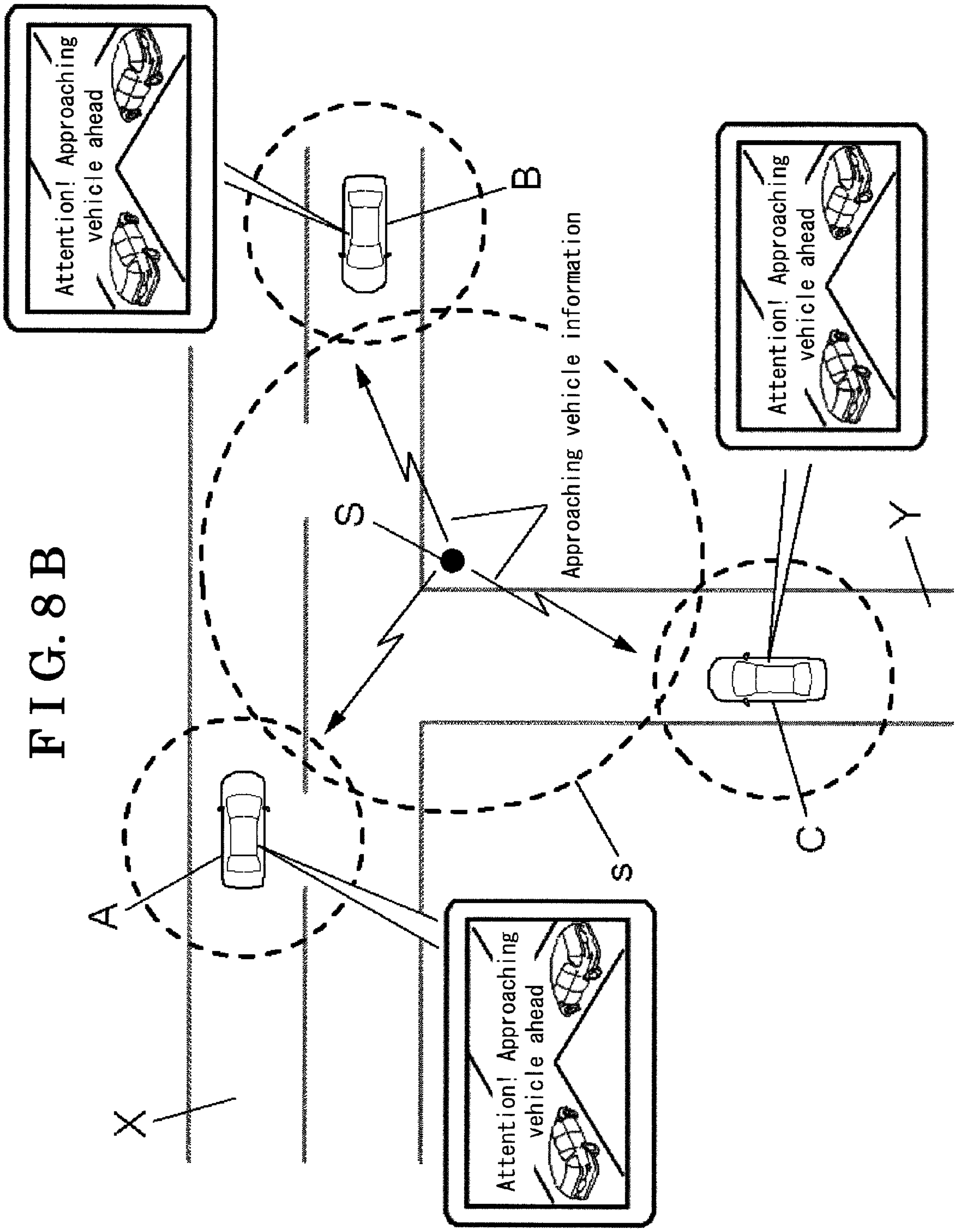

FIGS. 7A and 7B indicate an intersection at which a wide road X crosses a relatively narrow road Y, both of which have a one lane-on-one side roads. At a center portion of the intersection (in the vicinity of a portion where the road X crosses the road Y), a base station (base antenna) S that is capable of communicating with vehicles entering the intersection is provided. In this embodiment, the base station S outputs intersection information indicting that the intersection is close. A range within which the intersection information outputted by the base station S is receivable is indicated by a letter "s".

Further, FIG. 7A illustrates a vehicle A driving on the road X in a direction from the left in FIG. 7A toward the center portion of the intersection, a vehicle B driving on the road X in a direction from the right in FIG. 7A toward the center portion of the intersection and a vehicle C driving on the road Y in a direction from the lower in FIG. 7A toward the center portion of the intersection. Once the vehicles A through C enter the range s of the base station S, the antenna switching portion 21 of the vehicle-mounted communication device 1 provided at each vehicle switches so as to be connected to the non-directional antenna 11, and the sending-receiving switching portion 22 switches so as to be connected to the sending portion 24 (see FIG. 7B). Accordingly, the vehicle-mounted communication device 1 of each of the vehicles A through C turns in "a sending state using the non-directional antenna 11". In this sending state, each of the vehicle-mounted communication devices 1 send approaching vehicle information indicating that the own vehicle is approaching the intersection. A range within witch the approaching vehicle information outputted by the vehicle A is receivable is indicated by the letter "a", a range within which the approaching vehicle information outputted by the vehicle B is receivable is indicated by the letter "b", and a range within which the approaching vehicle information outputted by the vehicle C is receivable is indicated by the letter "c". The base station S receives each of the approaching vehicle informations.

Once the vehicle-mounted communication device 1 of each of the vehicle A through C sends the approaching vehicle information, the antenna switching portion 21 of the vehicle-mounted communication device 1 of each of the vehicles switches so as to be connected to the non-directional antenna 11, and the sending-receiving switching portion 22 of the vehicle-mounted communication device 1 of each of the vehicles switches so as to be connected to the receiving portion 25. Accordingly, the vehicle-mounted communication device 1 of each of the vehicles A through C turns in a "receive stand-by state by use of the non-directional antenna 11". "The receive stand-by state" is indicated by a schematic diagram of "Receiving mode" in FIG. 8A In this configuration, the base station S sends the approaching vehicle information, indicating that the vehicles A through C are approaching the intersection, to the vehicle-mounted communication devices 1 each of which are switched to the receive stand-by state (see FIG. 8B). When the vehicle-mounted communication device 1 of each of the vehicles A through C receives the approaching vehicle information, the vehicle-mounted communication device 1 operates the display to show "Attention! Approaching vehicle ahead", in order to notify the driver that another vehicle is approaching the intersection. In this configuration, because the driver may have knowledge that another vehicle is approaching the intersection before the own vehicle approaches the intersection, a collision at the intersection may be prevented.

Other Embodiments

In the embodiment described above, the vehicle 100 includes the non-directional antenna 11, the front directional antenna 12*f* and the rear directional antenna 12*r*, however, the configuration may not be limited to this and may be modified so as to include an antenna whose peak faces at least one of the front and rear of the vehicle 100. In other words, the vehicle 100 may include the front directional antenna 12*f* or the rear directional antenna 12*r*.

In the embodiment described above, the sending-receiving switching portion 22 switches so as to be connected to the sending portion 24 or the receiving portion 25, however, the configuration may not be limited to this and may be modified.

This disclosure may be applied to a communication device provided at a vehicle.

According to an aspect of this disclosure, a vehicle-mounted communication device includes a non-directional antenna provided at a vehicle and having a directional characteristic to send or receive a radio wave in all directions uniformly in a horizontal plane, at least one of directional antennas provided at the vehicle and having a directional characteristic to send or receive a radio wave in a specific direction and an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received.

In this configuration, the device selects the non-directional antenna or the directional antenna in order to receive/send information in accordance with a situation. Specifically, the antenna switching portion appropriately switches an antenna to be used between the non-directional antenna and the directional antenna. Thus, because the antenna in this disclosure does not need to be newly developed, the vehicle-mounted communication device is appropriately used for the inter-vehicle communication and the road-to-vehicle communication, without increasing a cost thereof.

According to an aspect of this disclosure, the directional characteristic of the directional antenna has a peak facing in a front direction of the vehicle.

In this configuration, compared to a case where a non-directional antenna is used at an identical output power, the directional antenna may execute the inter-vehicle communication and the road-to-vehicle communication within a longer range at the front of a vehicle to which the directional antenna is provided.

According to an aspect of this disclosure, the directional characteristic of the directional antenna has a peak facing in a rear direction of the vehicle.

In this configuration, compared to a case where a non-directional antenna is used at an identical output power, the directional antenna may execute the inter-vehicle communication and the road-to-vehicle communication within a longer range at the rear of a vehicle to which the directional antenna is provided.

According to an aspect of this disclosure, the antenna switching portion switches so as to be connected to the directional antenna in a case where the information to be sent is a traffic congestion information sent toward the rear direction of the vehicle.

In this configuration, because the traffic congestion information is sent to the rear of the vehicle, a following driver may be notified of the traffic congestion as soon as possible.

According to an aspect of this disclosure, the antenna switching portion switches so as to be connected to the directional antenna in a case where the information to be sent is an emergency information sent toward the front direction of the vehicle, the emergency information indicating that an emergency vehicle is approaching.

In this configuration, because the emergency information is sent to the front of the vehicle, a driver driving ahead may be notified of the emergency vehicle approaching from the rear. Accordingly, the vehicles may be driven onto a shoulder of the road in order to allow the emergency vehicle to pass unhinderingly.

According to an aspect of this disclosure, the antenna switching portion switches so as to be connected to the directional antenna in a case where the information to be received is received on the basis of a sent radio wave transmitted in a specific direction through the air.

In this configuration, because the directional antenna, whose antenna gain is higher compared to the non-directional antenna, is used, information comes from far away may be obtained.

According to an aspect of this disclosure, the antenna switching portion switches so as to be connected to the non-directional antenna in a case where the information to be sent indicates that there is an obstacle affecting a driving of the vehicle.

In this configuration, information indicating that the vehicle is disabled to move may be notified to vehicles located in the vicinity thereof, thereby preventing the vehicles from being colliding each other, or preventing a collision because the vehicle may move so as to avoid the vehicle having a breakdown. This may also result in preventing an occurrence of traffic congestion.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A vehicle-mounted communication device comprising:

a non-directional antenna provided at a vehicle and having a directional characteristic in all directions uniformly in a horizontal plane;

at least one of directional antennas provided at the vehicle and having a directional characteristic in a specific direction; and an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received.

2. A vehicle-mounted communication device according to claim 1, wherein the directional characteristic of the directional antenna has a peak facing in a front direction of the vehicle.

3. A vehicle-mounted communication device according to claim 1, wherein the directional characteristic of the directional antenna has a peak facing in a rear direction of the vehicle.

4. A vehicle-mounted communication device according to claim 1, wherein the antenna switching portion switches so as to be connected to the directional antenna in a case where the information to be sent is a traffic congestion information sent toward the rear direction of the vehicle.

5. A vehicle-mounted communication device according to claim 3, wherein the antenna switching portion switches so as to be connected to the directional antenna in a case where the information to be sent is a traffic congestion information sent toward the rear direction of the vehicle.

6. A vehicle-mounted communication device according to claim 1, wherein the antenna switching portion switches so as to be connected to the directional antenna in a case where the information to be sent is an emergency information sent toward the front direction of the vehicle, the emergency information indicating that an emergency vehicle is approaching.

7. A vehicle-mounted communication device according to claim 2, wherein the antenna switching portion switches so as to be connected to the directional antenna in a case where the information to be sent is an emergency information sent toward the front direction of the vehicle, the emergency information indicating that an emergency vehicle is approaching.

8. A vehicle-mounted communication device according to claim 5, wherein the antenna switching portion switches so as to be connected to the directional antenna in a case where the information to be received is received on the basis of a sent radio wave transmitted in a specific direction through the air.

9. A vehicle-mounted communication device according to claim 7, wherein the antenna switching portion switches so as to be connected to the directional antenna in a case where the information to be received is received on the basis of a sent radio wave transmitted in a specific direction through the air.

10. A vehicle-mounted communication device according to claim 2, wherein the antenna switching portion switches so as to be connected to the non-directional antenna in a case where the information to be sent indicates that there is an obstacle affecting a driving of the vehicle.

11. A vehicle-mounted communication device according to claim 3, wherein the antenna switching portion switches so as to be connected to the non-directional antenna in a case where the information to be sent indicates that there is an obstacle affecting a driving of the vehicle.

12. A vehicle-mounted communication device according to claim 4, wherein the antenna switching portion switches so as to be connected to the non-directional antenna in a case where the information to be sent indicates that there is an obstacle affecting a driving of the vehicle.

13. A vehicle-mounted communication device according to claim 5, wherein the antenna switching portion switches so as to be connected to the non-directional antenna in a case where the information to be sent indicates that there is an obstacle affecting a driving of the vehicle.

14. A vehicle-mounted communication device according to claim 6, wherein the antenna switching portion switches so as to be connected to the non-directional antenna in a case where the information to be sent indicates that there is an obstacle affecting a driving of the vehicle.

15. A vehicle-mounted communication device according to claim 7, wherein the antenna switching portion switches so as to be connected to the non-directional antenna in a case where the information to be sent indicates that there is an obstacle affecting a driving of the vehicle.

16. A vehicle-mounted communication device according to claim 8, wherein the antenna switching portion switches so as to be connected to the non-directional antenna in a case where the information to be sent indicates that there is an obstacle affecting a driving of the vehicle.

17. A vehicle-mounted communication device according to claim 9, wherein the antenna switching portion switches so as to be connected to the non-directional antenna in a case where the information to be sent indicates that there is an obstacle affecting a driving of the vehicle.

18. A vehicle-mounted communication device comprising:

a non-directional antenna provided at a vehicle and having a directional characteristic in all directions uniformly in a horizontal plane;

at least one of directional antennas provided at the vehicle and having a directional characteristic in a specific direction;

an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received, and the antenna switching portion switching so as to be connected to the directional antenna in a case where the information to be received is received on the basis of a sent radio wave transmitted in a specific direction through the air.

19. A vehicle-mounted communication device according to claim 18, wherein the antenna switching portion switches so as to be connected to the non-directional antenna in a case where the information to be sent indicates that there is an obstacle affecting a driving of the vehicle.

20. A vehicle-mounted communication device comprising:

a non-directional antenna provided at a vehicle and having a directional characteristic in all directions uniformly in a horizontal plane;

at least one of directional antennas provided at the vehicle and having a directional characteristic in a specific direction;

an antenna switching portion switching so as to be connected to one of the non-directional antenna and the directional antenna on the basis of information to be sent in a case where the information is sent from the vehicle and switching so as to be connected to one of the non-directional antenna and the directional antenna on the basis of information to be received in a case where the information transmitted through the air is received, and the antenna switching portion switching so as to be connected to the non-directional antenna in a case where the information to be sent indicates that there is an obstacle affecting a driving of the vehicle.

* * * * *